United States

Beiser

[11] 3,748,014

[45] July 24, 1973

[54] NEAR-CONFOCAL DEVICE FOR OPTICAL SCAN ENHANCEMENT

[75] Inventor: Leo Beiser, Flushing, N.Y.

[73] Assignee: Columbia Broadcasting System, Inc., New York, N.Y.

[22] Filed: Dec. 22, 1971

[21] Appl. No.: 210,745

[52] U.S. Cl. .................... 350/7, 350/294, 356/112
[51] Int. Cl. ............................................. G02b 17/00
[58] Field of Search .................. 350/6, 7, 54, 285, 350/169, 294; 356/112

[56] References Cited
UNITED STATES PATENTS

| | | | |
|---|---|---|---|
| 3,506,834 | 4/1970 | Buchsbaum | 350/169 |
| 3,619,028 | 11/1971 | Keene | 350/285 |
| 3,650,605 | 3/1972 | Little | 350/7 |
| 3,612,642 | 10/1971 | Dostal | 350/285 |
| 3,432,239 | 3/1969 | Holland | 356/112 |

*Primary Examiner*—David Schonberg
*Assistant Examiner*—Michael J. Tokar
*Attorney*—Granville M. Brumbaugh et al.

[57] ABSTRACT

Two scanning mirrors are mounted in near-confocal relation to a constraining mirror with which they cooperate to define an optical cavity. An optical beam is introduced into this near-resonator and experiences alternate reflection from one of the scanning mirrors on the one hand and the constraining mirror on the other. The reflection from the scanning mirrors occurs alternately from two fixed positions respectively centered on the two scanning mirrors, and the reflection from the constraining mirror occurs from a succession of nonrecurring positions (because of the adjustment of the scanning mirrors to provide a near-confocal resonator configuration). The scanning mirrors are given oscillations of small amplitude to produce beam scans on the constraining mirror of increasing amplitude at successive ones of the succession of positions. Ultimately the beam is reflected to a position where it is beyond constraint by the constraining mirror, and it escapes as an output beam executing a large-amplitude scan.

The two basic embodiments may be described as spherical and planar. The latter comprises either a positive lens or a concave reflector to transfer the beam between the scanning mirrors and the constraining mirror.

Additional features include the adaptation of the device to other deflection means such as gradient or Bragg scanning, the retro-reflection of the output beam as an input beam for additional cycling within the same device, and operation of a plurality of devices as modules in a system, the principle of periodic aperture transfer being employed so that the output beam of one device can serve as the input beam of another device.

15 Claims, 7 Drawing Figures

Patented July 24, 1973

X = BEAM INTO PLANE OF PAPER
• = BEAM OUT OF PLANE OF PAPER
→ = RETRO-REFLECT

NEAR-CONFOCAL DEVICE FOR OPTICAL SCAN ENHANCEMENT

BACKGROUND OF THE INVENTION

This invention relates to optical scan enhancement and, more particularly, to novel and highly effective methods and apparatus whereby a small optical scan, which is easy to generate but of limited utility, gives rise to a much larger, high-speed, high-resolution optical scan, which has much greater utility but which heretofore has not been easy to generate.

The need for low-inertia optical beam positioning, particularly as applied to laser beam information transfer, has led to a variety of scanning techniques. However, the simultaneous achievement of high speed and high resolution has been frustrated in large part by materials limitations. In the case of reflection by oscillating mirrors, for example, the limitation is clearly inertial.

Iteration configurations are known which overcome the inertial problems in providing a scanning beam by summing the contribution of a plurality of scanning elements, each scanning element being activated through a very small angle. In these iteration systems, however, the aperture size is progressively increased as the optical beam advances from one stage to the next. As a consequence, the physical dimensions increase, drive power increases and the resulting aberrations increase. This phenomenon is explained in my application Ser. No. 750,086, filed Aug. 5, 1968, now U.S. Pat. No. 3,625,585. That patent discloses a method called periodic aperture transfer for controlling this effect by optically imaging the aperture of one deflector upon the succeeding deflectors. That is, the progressive increase in aperture size occurs at the (static) transfer optics rather than at the (dynamic) scanning elements. In the method of iteration just described, the transfer optics need to be increased in size to cope with the increase in aperture size. Also, it is necessary to have a large number of stages in order to have a sizeable scan which in turn requires a large number of individual scanning elements together with apparatus for actuating them in a synchronous manner.

SUMMARY OF THE INVENTION

An object of the invention is to advance the stage of the art as described above and, in particular, to provide a method and apparatus facilitating great optical scan enhancement and a nearly ideal utilization of the scanning aperture. Another object of the invention is to provide a new and improved scanning configuration which utilizes the iteration technique but eliminates the large number of sequential stages heretofore required.

These and other objects are attained in accordance with the invention by the provision of optical scan means and optical constraining means defining an optical cavity and constructed and positioned in near-confocal relation: that is, their relation is nearly, but not exactly, confocal. ("Confocal" implies that the optics on opposite sides of the optical cavity share the same focal point.) This scanning method, in its simplest form, comprises angularly deflecting a mirror pair representing the two terminating mirrors associated with the deflection means. Beam source means introduces an optical input beam into the device so that the beam is repetitively cycled between the scan means and the constraining means. The mirror pair is preliminarily adjusted to shift the end point of each cycle on the constraining means from the starting point of each cycle by a predetermined amount. When actuated about this nominal position, they produce beam scans at the end points of each cycle of increasing amplitude in successive cycles. The beam is extracted when, after a countable number of cycles, it is beyond constraint by the constraining means. The extracted beam executes a scan which is magnified by a factor that depends on the number of times the beam is cycled through the optical cavity.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

If an optical cavity is perfectly confocal, it will cycle an arbitrary beam so that the end point of the cycle is the same as the starting point. In this invention the terminating mirrors are tilted slightly so that the optical cavity is nearly, but not exactly, confocal, and the beam will shift through the cavity in successive cycles: that is, the end point of each cycle will fall short of the starting point. By controlling the amount of shift, a technique is provided for obtaining a large number of iterations within the same optical stage. These cyclical end points will continue to regenerate in their successively shifting positions until a particular end point falls outside the constraining mirror. The light beam will then leave the system, having executed a countable number of iterations on the scanning elements. The final amplitude of scan is a function of the number of cycles completed in the cavity and the amplitude of scan of the individual scanning elements.

In the case where a raster scan is desired, vertical deflection may be provided by one scanning element and horizontal deflection by the other, each contributing independently to the raster while being amplified simultaneously. In cases where unequal aperture sizes may be appropriate to the task, the deflectors may be positioned unequal distances from the constraining mirror, thus providing unequal conjugate image magnifications and hence unequal deflector aperture sizes.

Alternatively, the vertical deflection may be generated by one optical cavity and the horizontal deflection by another in tandem with the first. The rates of oscillation of the two sets of scanning elements determine the corresponding scanning speeds in the vertical and horizontal directions.

Figure 1:
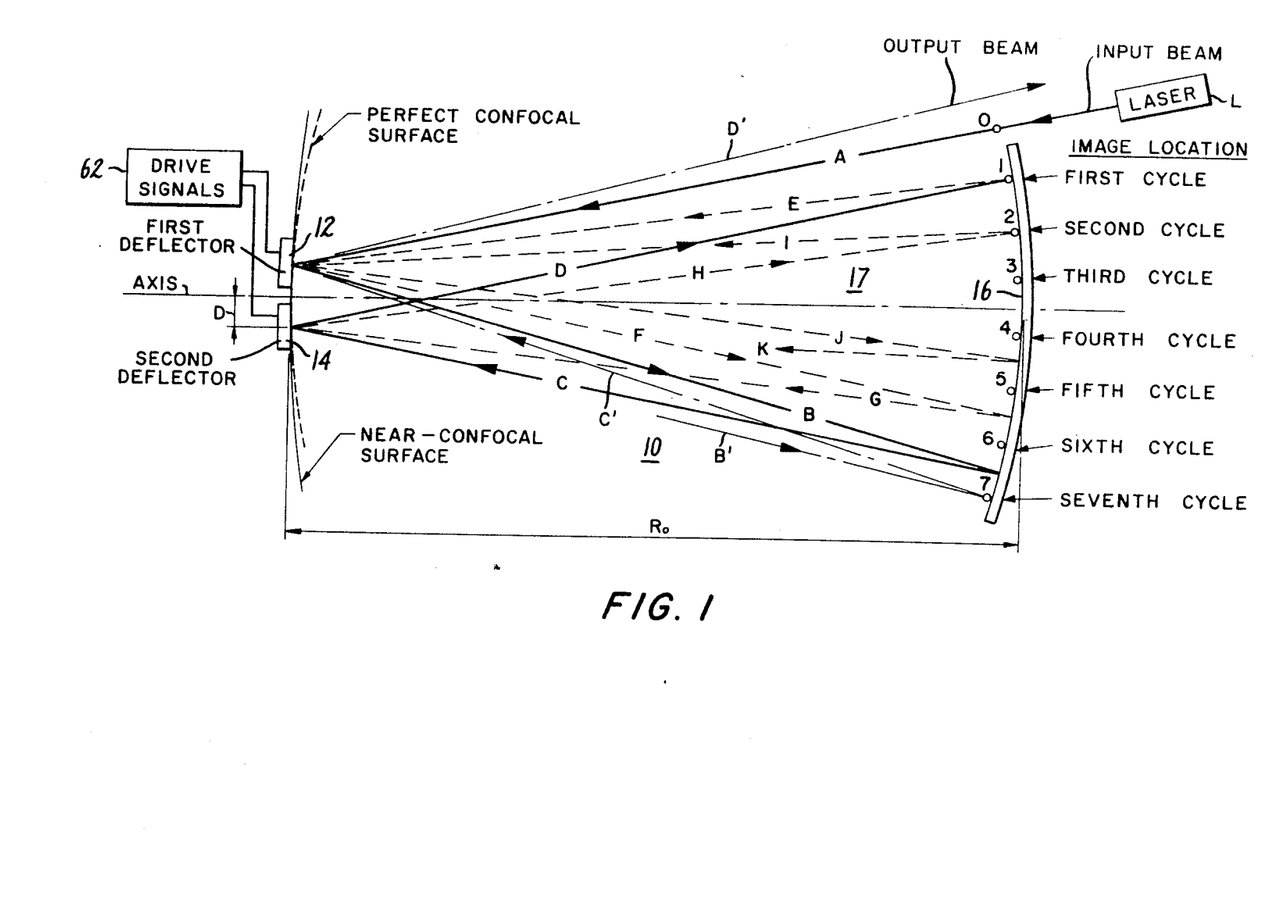
FIG. 1 is a schematic representation of a first embodiment (comprising spherical mirrors) of a near-confocal device for optical scan enhancement in accordance with the invention, in which central rays of a light beam are illustrated in order to facilitate an understanding of the operation of the device.

FIG. 1 discloses a near-confocal device 10 constructed in accordance with the invention. It comprises a first spherical deflecting (scanning) mirror 12, a second spherical deflecting (scanning) mirror 14, and a stationary spherical constraining mirror 16, which together define an optical cavity 17 with mirror separation equal to the common radius of curvature $R_o$. If the system 10 were perfectly confocal an input beam generated by a beam source such as a laser L, introduced into the device at point O, and reflected from the first deflector 12 would then successively be refelcted from the mirror 16 and the mirror 14 and leave the device, again passing through the point O as an output beam. However, the device 10 is rendered non-confocal (but nearly confocal) by virtue of an orientation of the mirrors 12 and 14 in such a manner that the image points of the beam at the ends of successive cycles are not coincident but fall short of the starting points, so that the system exhibits a shifting transverse degeneracy. Thus, at the end of the first cycle through the device the beam is not at point O but rather at point 1 on the mirror 16.

These cyclical end points will continue to regenerate in their successively shifting positions until a particular end point falls outside the constraining mirror 16. The light beam will then leave the system, having executed a countable number of iterations on the deflecting members 12, 14. The quantity of iteration can be controlled to be a countable large number; hence the degree of scan magnification can be very great and closely controlled.

FIG. 1 traces the near-confocal reflex process. The figure is simplified by showing only principal rays rather than the entire beam. (The beam width is typically equal to the width of the deflector 12 or 14.) In this symmetric confocal embodiment, the beam width at mirror 16 is equal to that on mirror 12 or 14, and remains constant throughout the entire iterative imaging process. (In this symmetric case, the beam has a "confocal waist" midway between the mirrors 12, 14 on the one hand and the mirror 16 on the other equal to $\sqrt{1/2}$ times the width of the beam on the mirrors. In unsymmetric cases, the beam width on mirror 16 may be reduced in size to the minimum of a diffraction-limited focal point, as launched from the width of the mirrors 12 and 14 over the separation $R_o$.) The principal ray A of the input beam enters at point O and is directed toward the first deflector 12. It is reflected from the first deflector 12 as ray B, from the mirror 16 as ray C and from the second deflector 14 as ray D and reaches a point 1 labeled "IMAGE LOCATION — FIRST CYCLE." It continues as rays E, F, G, H, ending at point 2 labeled "IMAGE LOCATION — SECOND CYCLE." It continues as rays I, J, K, etc., (the figure is further simplified by omitting most of the remaining principal rays), ending successively at points 3, 4, 5, 6, 7, labeled, respectively, "IMAGE LOCATION — THIRD CYCLE, FOURTH CYCLE, FIFTH CYCLE, SIXTH CYCLE, SEVENTH CYCLE." The rays thus successively impinge on each of the (in this case, seven) available terminal positions from one end of the mirror 16 to the other. Finally, the ray B' ending at point 7 is reflected by the mirror 16 as ray C' to the first deflector 12 and by the first deflector 12 as ray D'. The ray D' is beyond constraint by the mirror 16 and leaves the cavity as the central ray of the output beam, which is displaced ½ aperture from the input beam after having been reflected $(2 \times 7) + 1 = 15$ times by the deflectors 12, 14, in 7-½ cycles through the device.

Some of the design considerations and properties of this new scanning configuration are as follows:

1. The shift between cyclical launching and end points (e.g., between points 1 and 2 or 2 and 3, etc.) of the principal rays on the mirror 16 is adjusted by correct orientation of the deflectors 12, 14 to allow clear separation of the final iteration without its being partly obscured by the edge of the mirror 16.

2. The deflecting apertures 12, 14 may tilt (oscillate) in a desired direction to produce a p-fold beam-scan magnification of a single tilt in that direction, p being the multi-pass factor (the number of cycles made by the beam in passing through the device).

3. The input beam may enter from a point outside the plane of FIG. 1; the iteration will continue as before, and the image points on the mirror 16 will be half above and half below the plane of the figure. The loci of image points on the mirror 16 will again form lines.

Figure 2:
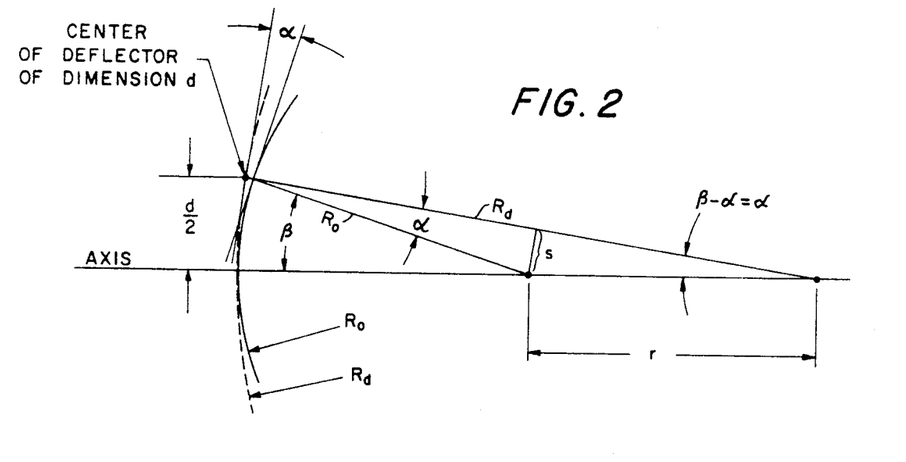
FIG. 2 is a schematic representation of the device of FIG. 1, in which certain geometric construction lines are illustrated in order to facilitate an understanding of the construction and adjustment of the device.

FIG. 2 illustrates a near-confocal reflective system in which $R_o$ is the perfect confocal radius and $R_d$ is the mirror radius, $R_d > R_o$. The mirror elements 12, 14 (FIG. 1) are to be placed on an imaginary surface having a larger radius of curvature $R_d$ so that in this symmetric case the images on the mirror 16 after successive cycles are separated by one aperture width $d$. Since each beam cycle includes two mirror apertures and the change in angle is double the magnitude of the tilt of the deflector, then, in order to make the separation between successive points 1, 2, 3, 4, 5, 6, 7 on the mirror 16 equal to the aperture diameter d, mirrors 12 and 14 must be tilted through an angle $\alpha$ which is ¼ that distance over a radius $R_o$ on the mirror 16. Thus $$\alpha = \tfrac{1}{4}\, d/R_o.$$

(1)

The new radius $R_d$ is larger than $R_o$ by the distance $r$, as illustrated in FIG. 2, determined as follows: $\beta$ is the angle subtended by $d/2$ over the distance $R_o$. Thus, $\beta = d/2R_o$, which with equation (1) yields $$\beta = 2\alpha.$$

(2)

Since, as FIG. 2 shows, $s = \alpha R_o$, and since $\beta - \alpha = \alpha$, then $$r = s/(\beta - \alpha) = R_o,$$

which yields $$R_d = 2R_o. \tag{3}$$

A more general relationship which allows the centers of mirrors 12 and 14 to be displaced from the axis by the distance D and which provides a fractional separation a of the aperture dimension d at the image points on mirror 16 is $$R_d = R_o/1-(ad/4D). \tag{3a}$$

When $a = 1$ and $D = d/2$, then equation (3a) reduces to the symmetric special case of equation (3).

Similarly, the more general expression for equation (1) is $$\alpha = ad/4R_o. \tag{1a}$$

A simple method of separating input and output beams is to cause the input beam to enter the system slightly out of the plane of FIG. 1, inclined through an angle $\gamma_1 = ad/2R_o$. Thus, all the "½-cycle" beams (i.e., the beam at the end of ½ cycle, 1-½ cycles, 2-½ cycles, etc.) will be displaced or "sheared" with respect to the "full-cycle" beams (i.e., the beam at the end of 1 cycle, 2 cycles, 3 cycles, etc.). This includes the important input and output beams, allowing for convenient pick-off of the output beam.

Another method of separating the input and output beams is to tip mirrors 12 and 14 through opposite small angles $\gamma_2$ about an axis in the plane of FIG. 1 and bisecting the mirrors 12, 14. This will place all images from the upwardly tilted mirror above the plane of the figure and from the downwardly tilted mirror below the plane of the figure —again a "shearing" of the two image groups, even though the input point O is in the plane of the figure. The magnitude of $\gamma_2$ is $1/p$ of $\alpha$, the one-element tilt derived above. Thus, $$\gamma_2 = \pm \alpha/p = \pm a/4\ p\ d/R_o. \tag{4}$$

Either method of beam separation permits extraction after $p$ cycles, where $p$ is an integer plus ½. In the case illustrated in FIG. 1, $p = 7$-½, and the beam exits from the same general region as its input point. To extract the beam from the opposite side of the mirror 16 (after traversing an integral number of cycles), it is merely required to provide an opening at the terminating point of the beam after that number of cycles. As illustrated in FIG. 1, for example, an opening at the bottom of mirror 16 at point 7 will extract the beam at the end of the $p=$ 7th cycle.

Figure 3:
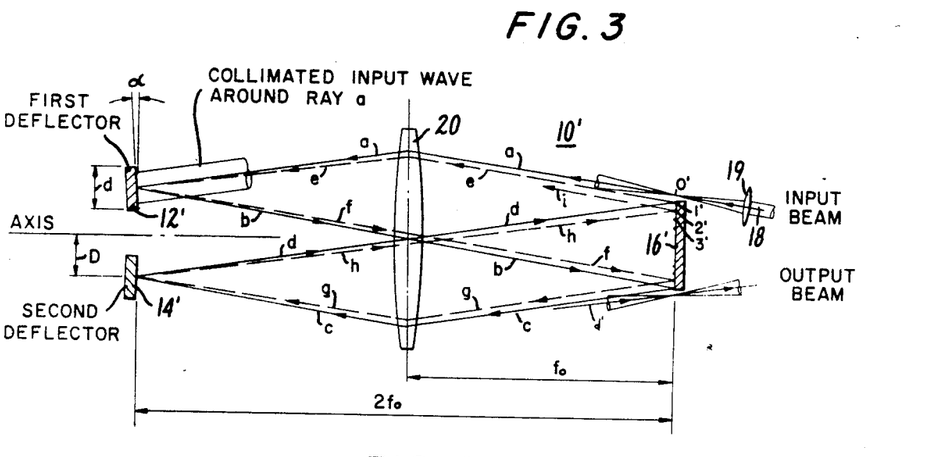
FIG. 3 is a schematic representation of a second embodiment (comprising plane mirrors with a center lens) of a near-confocal device for optical scan enhancement in accordance with the invention.

The planar conjugate confocal system 10' (FIG. 3) comprises flat mirrors 12', 14' and a flat constraining mirror 16', which can be much smaller than the mirror 16 of FIG. 1. This arrangement is a transformation of the arrangement of FIG. 1, using a refractive lenticular element 20 of focal length $f_o$ positioned midway between planar near-conjugate mirrors separated by $2f_o$. Again, for simplicity, mainly principal rays are traced. It should be understood, as before, that the entire aperture $d$ of the mirrors 12', 14' is utilized. A collimated input beam 18 is focused by a positive lens 19 at point 0' in the focal plane of positive lens 20. The rays diverge from point 0' (only the principal ray $a$ is shown) and are collimated by the lens 20 so that the beam fills the aperture $d$ of the first mirror 12'. The rays are reflected, still collimated, from the first mirror 12' (only the principal ray $b$ is shown) and brought to a focus by the lens 20 at the end of ½ cycle on the mirror 16'. The rays are then reflected, diverging from the focus, from the mirror 16' (only the principal ray $c$ is shown) and are collimated by the lens 20 so that the beam fills the aperture $d$ of the second mirror 14'. The rays are reflected, still collimated, from the second mirror 14' (only the principal ray $d$ is shown) and brought to a focus by the lens 20 at the end of one full cycle at point 1' on the mirror 16'. The principal rays complete a second cycle through the device 10' as rays $e, f, g, h$, whereupon the rays arrive in focus at point 2' on the mirror 16', displaced below poing 1' by a distance equal to the distance by Which point 1' is displaced below point 0'. The cycles continue as described in the concave mirror near-confocal system 10, and the beam ultimately exits as the output beam of which the principal ray $d'$ is illustrated in FIG. 3. The output beam is a diverging wave group, having gone through focus in the plane of the mirror 16'.

The conditions of beam separation yielding a countable number of iterations are as described above. At the mirror 16' appear the foci of the waves emanating from the deflecting apertures which are illuminated by collimated light. These spacings $\delta$, as a function of the wavelength $\lambda$ of the light, are, therefore, of the order of $$\delta = f_o/d\ \lambda. \tag{5}$$

As developed earlier, the angular adjustment $\alpha$ (departure from the normal to the system optical axis) of each mirror 12', 14' is such as to displace successive iterations at mirror 16' by at least a distance $a'\delta$ for clear beam separation, in which $a'$ is the factor which increases the distance $\delta$. Since the angular diffraction spread from the aperture $d$ is approximately $\lambda/d$ and enhancement occurs four times (twice by reflection; two times); then $$\alpha = \tfrac{1}{4}\ (\lambda/d) = a'\delta/4f_o. \tag{6}$$

If this pair of plane mirrors is to be replaced by a single curved surface (not separately illustrated, since the curvature is so slight that the illustration of the reflecting apertures would be very much as in FIG. 3), it would form a convex mirror segment having a radius of curvature $R_d$ centered on the system axis to the left of the figure. The value of $R_d$ is such as to subtend the distance D as measured through the angle $\alpha$. Thus, $$R_d = D/2\alpha,$$

which when combined with equation (6) above yields $$R_d = 4f_oD/a'\delta \tag{7}$$

The planar conjugate near-confocal system offers the opportunity to use plane mirrors for the deflectors 12' and 14' and for the mirror 16' and allows the deployment of a much smaller mirror 16' than that required for the symmetric concave mirror system. In principle, since the focused images on the mirror 16' are much smaller than the aperture width $d$, the mirror 16' in the planar system may be smaller than either of the deflecting apertures, and may be proportionately slimmer (as in the concave mirror arrangement) in the dimension normal to the plane of FIG. 3 than in the dimension illustrated in FIG. 3. Simple lenticular manipulation is required to launch a focused wave into this system and to extract and separate the exiting diverging wave. As in the concave mirror system, the "½" sets of images may be sheared on the mirror 16' to facilitate beam separation.

Figure 3A:
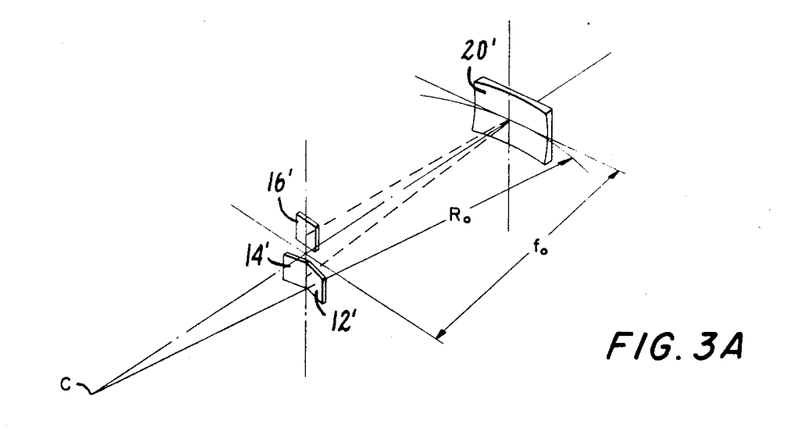
FIG. 3A is a schematic representation of a modification (comprising plane mirrors with a center spherical reflector) of the embodiment of FIG. 3.

A comparative disadvantage of the planar conjugate system is the higher optical losses due to multiple surface reflections at and absorption by the lens 20. It is, of course, possible to replace the lens 20 with a concave (e.g., spherical or parabolic) mirror segment 20' (FIG. 3A). The mirror 20' has a focal length $f_o$ and is at a distance $f_o$ from the deflectors 12', 14' and the mirror 16'. This system still requires one extra mirror (as compared to concave mirror near-confocal systems) and, more importantly, four extra reflections per beam cycle, imposing correspondingly increased losses during multiple iteration.

As the preceding disclosure reveals, a near-confocal mode can be established by first forming a split confocal (that is, one end mirror is divided into two) and assigning closely spaced aperture dimensions d to each of the split elements. The reflecting surfaces are then tilted away from their inwardly directed normals through the angle $\pm \alpha = ad/4f_o$, where $f_o$ is here defined as the image distance from the lenticular element. (In a concave mirror confocal, $f_o = R_o$; not its focal length $R_o/2$.)

The tilted apertures may be considered as oriented on a new common surface having a radius (equation 7 for $D = d/2$)

$$R_d = 2f_o d/a\delta,$$

in which the ratio $d/\delta$ is the linear demagnification of the aperture d to its conjugate size $\delta$.

The tilted pair of mirrors each having a height d can be replaced with a single mirror (of height 2d) having a surface radius of curvature $R_d$, so long as the resulting progressively expanding aperture size on mirror 16 may be tolerated. After a few iterations, the tilt angle $\alpha$ must be increased for clear separation of waves.

The preferred configuration for high-order multipass is, therefore, the split confocal with tilted elements retaining their original curvature (or planeness).

Figure 4:
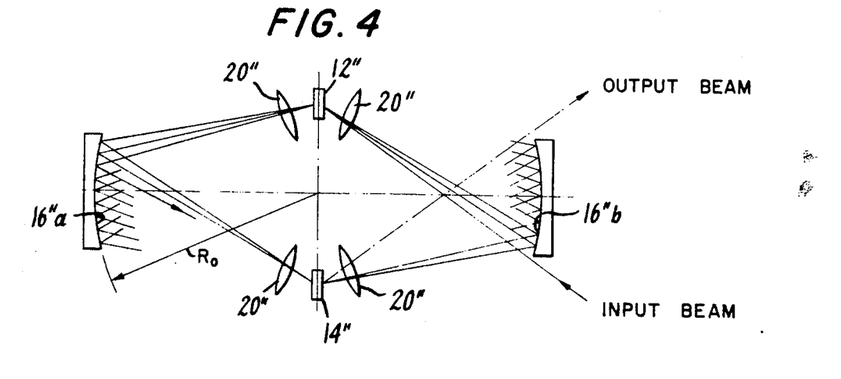
FIG. 4 is a schematic representation of a near-confocal device in accordance with the invention including a pair of Bragg scanners.

A variation which further generalizes the near-confocal system is its adaptation to Bragg reflection scanning. The Bragg cell is a transmission device characterized by a total refraction angle (output with respect to input) which, over a narrow range of input angle, is independent of input angle. A pair of Bragg scanners 12'', 14'' arranged as in FIG. 4 acquire the characteristics of a lens in a concentric degenerate resonator. Near-confocal reflex action will take place among the pair of mirrors 16''a, 16''b as though they were the single mirror 16 or 16' of the devices described above. Application to Bragg reflection scanning is not usually as advantageous as mirror scanning, because of the greater transmission losses and angular sensitivity of the Bragg medium with fixed plane wave acoustic excitation. Also, lenticular assist must be provided by lenses 20'' having focal lengths equal to $R_o$ at the inputs and outputs of the Bragg cells to reinstitute the stationary confocal modal volume.

A distinguishing feature of the near-confocal reflex device is the utilization of a pair of deflecting components which may be actuated wholly independently or in any desired dependent relationship. The deflection of the output beam caused by actuation of one deflector is independent of the deflection of the output beam caused by actuation of the other deflector. Thus, if the deflectors are actuated simultaneously and in complementary phase, the effect on the output beam is cumulative; or, if the deflectors are actuated independently, complex scans can easily be produced. Functionally, the two deflectors provide two degrees of freedom. They may be spaced unequally from the constraining mirror, so long as the convention for optical imaging is retained among the two deflector mirrors and the lenticular element. In the concave confocal, the familiar reflective (thin) lens formula $2/f_o \approx 1/R_1 + 1/R_2$ establishes the unequal spacings $R_1$ and $R_2$ with respect to the radius of curvature $R_o$ of the constraining mirror. This may also be expressed as $R_o \approx \sqrt{R_1 R_2}$, in which the value of $R_o$ approximates the geometric mean between the two unequal spacings $R_1$ and $R_2$.

Figure 5:
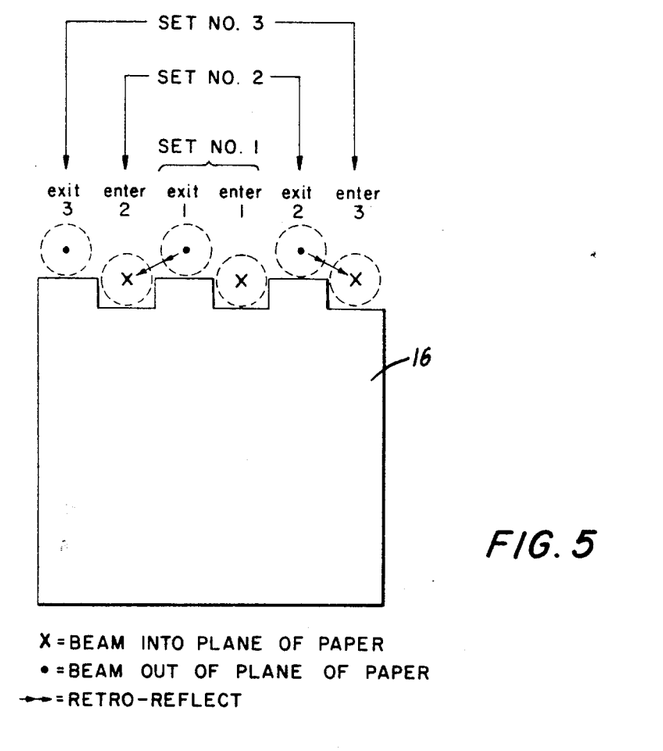
FIG. 5 is a schematic representation of multiple recycling through a near-confocal device in accordance with the invention.

The output beam can be retro-reflected (FIG. 5) into the reflex system for an additional set of $p$ cycles. Such recycling can be repeated a number of times depending on the transverse spaces on the constraining mirror. In FIG. 5, the third and last set of $p$ cycles occurs along the left and right edges of the mirror 16.

Figure 6:
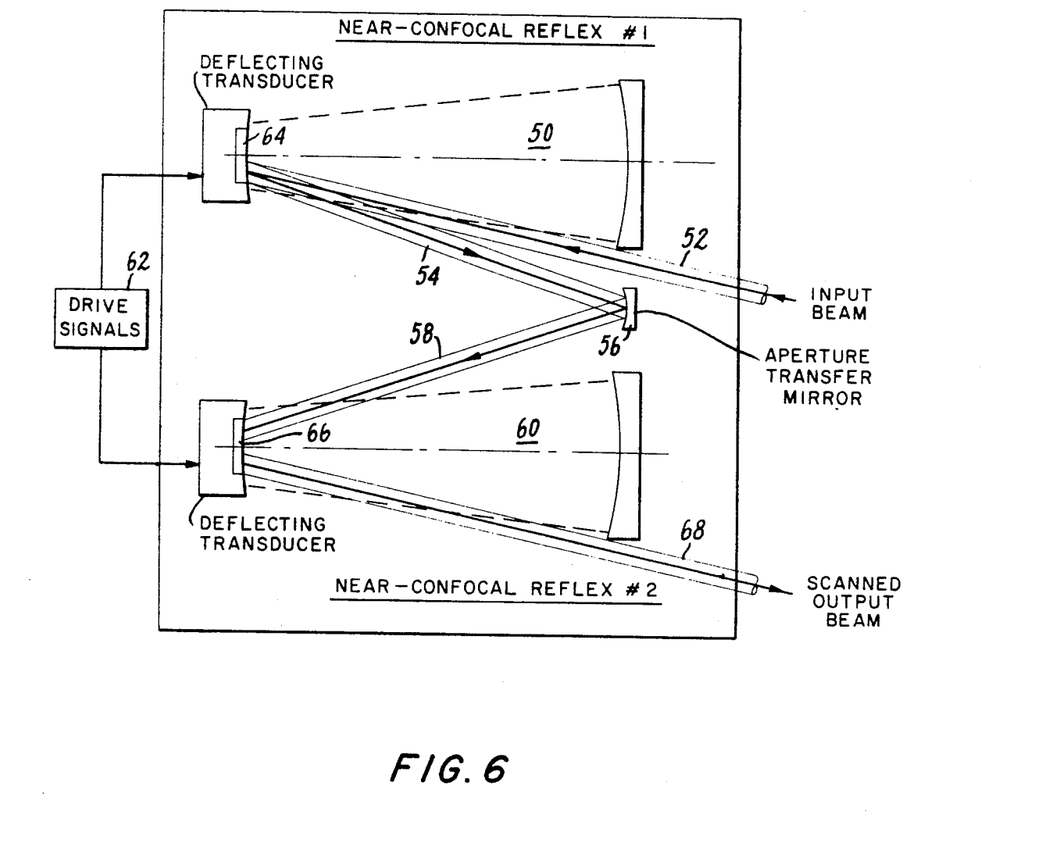
FIG. 6 is a schematic representation of a pair of near-confocal devices in tandem in accordance with the invention, employing aperture transfer from the first stage to the second.

Finally, a plurality of reflex systems can be operated in series (FIG. 6), periodic aperture transfer being utilized to transfer the beam from one system to the next. A near-confocal reflex system 50 processes an input beam 52 and produces an output beam 54 that is reflected by an aperture transfer mirror 56 to serve as an input beam 58 to a near-confocal reflex system 60. Drive signals from a drive signal generator 62 actuate deflectors 64 and 66. The deflectors 64 and 66 can cause scan of the output beam 68 in one direction for increased scan enhancement in that direction or in two independent directions (for example, to produce a raster scan).

The systems described herein can be simply adjusted, first by establishing a "perfect confocal" device (having a confocal radius $R_o$), and then, using conventional screw adjustments (not shown), tilting the deflecting mirrors in opposite directions through the angle $\pm\alpha$ as disclosed and defined herein. Since this is not to act as an optical resonator, adjustment is not critical.

Thus there are provided in accordance with the invention novel and highly effective methods and apparatus whereby a small optical deflection gives rise to a large, high-speed, high-resolution optical scan. Many modifications of the representative embodiment of the invention disclosed herein will readily occur to those skilled in the art. Accordingly, the invention is to be construed as including all of the embodiments thereof within the scope of the appended claims.

I claim:

1. A device for optical scan enhancement comprising:
   first and second mirrors and optical constraining means having a predetermined area positioned relative to each other so as to share almost the same focal point and to define an almost-confocal optical cavity having an optical axis lying in a plane of symmetry disposed between and substantially equidistant from said first and second mirrors and substantially bisecting said optical constraining means, means for introducing an optical input beam into said optical cavity from a direction to be incident on one of said first and second mirrors, said first and second mirrors being quiescently oriented to cause said beam to be cycled between alternate ones of said first and second mirrors and progressively shifting non-recurring positions upon said constraining means, and means for controllably angularly deflecting said optical beam, said almost-confocal cavity being operative to increase the amplitude of the angular deflection of said beam in successive cycles while constrained within said constraining means until said beam is ultimately deflected to a position beyond the constraint of said constraining means and leaves said optical cavity as an output beam executing an enhanced angular scan.

2. A device for optical scan enhancement according to claim 1 wherein said first and second mirrors have an aperture width $d$ and said constraining means comprises a concave spherical mirror having a radius of curvature $R_o$ substantially centered on said optical axis, and said first and second mirrors are disposed on a radius of curvature $R_d > R_o$ so as to be tilted by an angle $\alpha$ with respect to the orientation they would have if placed on an imaginary surface having a radius of curvature $R_o$, characterized in that $$\alpha = ad/4R_o$$

whereby said beam is imaged on said spherical mirror in successive cycles at points separated by a desired distance $ad$ proportional to the aperture width $d$ by the factor $a$.

3. A device for optical scan enhancement according to claim 1 wherein said means for angularly deflecting said optical beam comprises means for changing the angular positions of said first and second mirrors from their quiescent positions and said constraining means comprises a concave spherical mirror, and wherein said beam-introducing means introduces said input beam into said optical cavity from a point beyond the constraint of said constraining means and onto said one of said first and second mirrors at such an angle that said output beam is angularly separated from said input beam, whereby separation of said output and input beams is facilitated.

4. A device for optical scan enhancement according to claim 1 wherein said means for angularly deflecting said optical beam comprises means for changing the angular positions of said first and second mirrors from their quiescent positions and wherein said first and second mirrors each have an aperture width $d$, said constraining means comprises a concave spherical mirror having a radius of curvature $R_o$, and said first and second mirrors and said concave spherical mirrors are dimensioned and arranged to cause said beam to execute $p$ cycles in said optical cavity; and wherein said first and second mirrors are tilted through opposite angles $\gamma_2$ about an axis passing through each mirror, characterized in that $$\gamma_2 = \pm a/4p \, d/R_o$$

where $ad$ is the desired separation of the image of said beam on said spherical mirror in successive cycles proportional to the aperture width $d$, whereby separation of input and output beams is facilitated.

5. A device for optical scan enhancement according to claim 1 wherein said optical beam is a light beam, said first and second mirrors are plane mirrors of aperture width $d$ and said constraining means comprises a plane mirror, further comprising:

a positive lens of focal length $f_o$ positioned on said optical axis, said first and second mirrors being mounted on one side of said lens at a distance $f_o$ therefrom and said constraining plane mirror being mounted on the other side of said lens at a distance $f_o$ therefrom, and means for changing the angular positions of said first and second plane mirrors from their quiescent positions to angularly deflect said light beam, the deflecting apertures associated with said first and second plane mirrors being illuminated by light collimated by said lens and the foci of the light waves emanating from said deflecting apertures being spaced apart on said constraining plane mirror at the ends of successive cycles by a distance proportional to the aperture width $d$ divided by the distance $f_o$.

6. A device for optical scan enhancement according to claim 1 wherein said optical beam is a beam of light, said first and second mirrors are plane mirrors of aperture width $d$ and said constraining means comprises a plane mirror, and further comprising:

a positive lens of focal length $f_o$ positioned on said optical axis, said first and second mirrors being mounted on one side of said lens at a distance $f_o$ therefrom and said constraining plane mirror being mounted on the other side of said lens at a distance $f_o$ therefrom, said first and second mirrors being illuminated by light collimated by said lens, and the foci of the light waves emanating from each of said first and second mirrors and passing through said lens being spaced apart on said constraining plane mirror a desired distance $a\delta$, and normals to each of said first and second plane mirrors being tilted with respect to said optical axis through opposite angles $\alpha$, characterized in that $$\alpha = (a'\delta/4f_o)(a\delta/4f_o)$$

where $a$ is proportionality factor having a value to provide said desired distance $a\delta$, and $\delta$ is the size of the focal spot on said constraining plane mirror.

7. A device for optical scan enhancement according to claim 1 wherein said first and second mirrors are spaced unequally by distances $R_1$ and $R_2$ from the constraining means such that the value of $R_o$ is substantially equal to the geometric mean between $R_1$ and $R_2$ and the aperture sizes of said mirrors are in the ratio of $R_1/R_2$.

8. A device for optical scan enhancement according to claim 1 wherein said first and second mirrors are plane mirrors each supported to be operative to function as a deflector and said constraining means comprises a plane mirror, and further comprising:

concave mirror means having a focal length $f_o$ for transferring the beam between said first and second mirrors and said plane mirror, said first and second mirrors and said plane mirror being positioned side-by-side at a distance $f_o$ from said concave mirror.

9. A device for optical scan enhancement according to claim 8 wherein said concave mirror means of focal length $f_o$ is spherical.

10. A device for optical scan enhancement according to claim 8 wherein said concave mirror means of focal length $f_o$ is parabolic.

11. A device for optical scan enhancement according to claim 1 wherein said means for angularly deflecting said beam comprises a pair of Bragg scanners each having an input and an output and said constraining means comprises a pair of concave spherical mirrors positioned in confronting relationship on said optical axis, and further comprising:

a separate lens of focal length equal to that of said concave mirrors coupled to the input and to the output of each of said Bragg scanners, one of said concave spherical mirrors being positioned relative to said Bragg scanners to reflect the output of a first of said Bragg scanners as input to the second of said Bragg scanners, and the other of said concave spherical mirrors being positioned relative to said Bragg scanners to reflect the output of the second of said Bragg scanners as input to the first of said Bragg scanners.

12. A device for optical scan enhancement according to claim 1 wherein said means for deflecting said optical beam comprises means for actuating said first and second mirrors simultaneously and in complementary phase, whereby the scanning effect produced is cumulative.

13. A device for optical scan enhancement according to claim 1 wherein said means for deflecting said optical beam comprises means for actuating said first and second mirrors independently, whereby the scanning effect produced has two degrees of freedom.

14. A device for optical scan enhancement according to claim 1 wherein the input beam after executing a number of cycles in said cavity leaves said cavity as an output beam, further comprising:

retro-reflection means positioned relative to said cavity to reintroduce the output beam from said cavity into said cavity from said direction to be incident on said one of said first and second mirrors, whereby said beam executes an additional number of cycles in said device.

15. Apparatus for optical scan enhancement comprising:

the device for optical scan enhancement according to claim 1 in combination with a second device for optical scan enhancement according to claim 1, the combination further comprising aperture transfer means including a concave mirror positioned in almost-confocal relation to the exit aperture of a first of said devices and the input aperture of the second of said devices for transferring said output optical beam from the first-named of said devices to the input aperture of said second device for additional cycling in the cavity thereof, and wherein said means for angularly deflecting said optical beam in each of said first and second devices comprises means for changing the angular positions of said first and second mirrors in such a manner that said second device produces an output beam which executes a scan conforming to a predetermined pattern.

* * * * *